(12) United States Patent
Mu et al.

(10) Patent No.: US 11,605,017 B1
(45) Date of Patent: Mar. 14, 2023

(54) MACHINE-LEARNING BASED DETECTION OF POLICY-VIOLATING INFORMATION IN CONTENT

(71) Applicant: Meta Platforms, Inc., Menlo Park, CA (US)

(72) Inventors: Yang Mu, Fremont, CA (US); Giridhar Rajaram, Cupertino, CA (US); Daniel Olmedilla de la Calle, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1176 days.

(21) Appl. No.: 15/854,745

(22) Filed: Dec. 26, 2017

(51) Int. Cl.
*G06N 5/02* (2006.01)
*G06N 3/08* (2006.01)
*G06N 20/00* (2019.01)
*G06N 5/022* (2023.01)
*H04L 67/306* (2022.01)
*G06N 3/084* (2023.01)
*G06V 40/16* (2022.01)

(52) U.S. Cl.
CPC ............ *G06N 20/00* (2019.01); *G06N 5/022* (2013.01); *G06N 3/084* (2013.01); *G06V 40/168* (2022.01); *G06V 40/172* (2022.01); *H04L 67/306* (2013.01)

(58) Field of Classification Search
CPC ......... G06N 5/022; G06N 3/084; G06N 20/00
See application file for complete search history.

(56) References Cited

U.S. PATENT DOCUMENTS

| | | | |
|---|---|---|---|
| 6,854,879 B2 | 2/2005 | Pavlidis | |
| 8,718,337 B1 * | 5/2014 | Syrett | G06V 40/172 382/118 |
| 8,788,442 B1 | 7/2014 | Sculley, II et al. | |
| 2008/0260212 A1 | 10/2008 | Moskal et al. | |
| 2011/0116690 A1 * | 5/2011 | Ross | G06K 9/622 382/118 |
| 2012/0102547 A1 * | 4/2012 | Fransdonk | H04L 67/02 726/4 |

(Continued)

OTHER PUBLICATIONS

Fette L., et al., "Learning to Detect Phishing Emails," In Proceedings of International World Wide Web conference, Banff, Canada, 2007, pp. 649-656.

(Continued)

*Primary Examiner* — Luis A Sitiriche
(74) *Attorney, Agent, or Firm* — Fenwick & West LLP (57) ABSTRACT

For various content campaigns (or content), an online system generates a score indicating a likelihood of the content item having deceptive information, such as including a picture or name of a celebrity to promote something that the celebrity has not actually endorsed. The online system receives a request to determine whether a content item comprises deceptive information. The online system extracts features from the content item, and provides the extracted features to a machine learning based model configured to generate score indicating whether a content item comprises deceptive information. The online system executes the machine learning based model to generate the score for the content item. Responsive to the generated score indicating that content item comprises deceptive information, the online system verifies whether the content item conforms to content policies.

20 Claims, 4 Drawing Sheets

(56) References Cited

U.S. PATENT DOCUMENTS

| | | | | |
|---|---|---|---|---|
| 2013/0138428 | A1* | 5/2013 | Chandramouli | G06F 40/30 |
| | | | | 704/9 |
| 2016/0071162 | A1* | 3/2016 | Ogawa | G06Q 50/01 |
| | | | | 705/14.66 |
| 2016/0283975 | A1 | 9/2016 | Kaul et al. | |
| 2016/0321582 | A1* | 11/2016 | Broudou | G06N 20/00 |
| 2017/0262635 | A1* | 9/2017 | Strauss | G06F 21/10 |
| 2017/0270210 | A1* | 9/2017 | Padmanabhan | G06F 16/9024 |
| 2017/0346851 | A1* | 11/2017 | Drake | H04L 63/0428 |
| 2018/0129940 | A1* | 5/2018 | Qian | G06Q 10/10 |
| 2018/0218283 | A1 | 8/2018 | Jenson | |

OTHER PUBLICATIONS

Frank E., et al., "Text Categorization Using Compression Models," In Proceedings IEEE Data Compression Conference, Snowbird, Utah, 2000, 1 page.

Sharman K.C., "Maximum likelihood parameter estimation by simulated annealing," ICASSP-88., International Conference on Acoustics, Speech, and Signal Processing, Apr. 1988, pp. 2741-2743.

Teahan W.J., et al., "Using Compression-Based Language Models for Text Categorization," in Proceedings of 2001 Workshop on Language Modeling and Information Retrieval, 2001, pp. 141-165.

Zheng R., et al., "A Framework for Auiliorship Identification of Online Messages: Writing-Style Features and Classification Techniques," Journal of the American Society for Information Science and Technology, 2006, vol. 57(3), pp. 378-393.

* cited by examiner

MACHINE-LEARNING BASED DETECTION OF POLICY-VIOLATING INFORMATION IN CONTENT

BACKGROUND

This disclosure relates generally to online systems, and more specifically to predicting content items violating policies of online systems using machine learning based models.

Online systems (such as social networking systems) allow content providers to deliver content in a content campaign (also referred to as a content item) that is targeted to certain online systems' users. However, the content may include context violations that violate policies of the online systems. For example, content providers may include deceptive material in a content item, or a user's interaction with the content may link the user to improper content or an improper external webpage. One useful approach is to use traditional models to predict how likely it is that a content item violates policies of the online systems. Typically, training data labelled by human reviewers is used to train the traditional models. The human reviewers' false negatives may greatly affect prediction precision of the traditional models. For example, a single user account in an online system may create several policy-violating content items. If one of the content items was labelled as policy-violating by mistake, then this user's weight generated by the traditional models may decrease dramatically and other bad accounts created by this user may be likely missed by the traditional models. Additionally, the same user may create policy-violating content items using different features (such as by changing the landing page domain, title, images, etc.). Dynamic changing of features associated with bad accounts may cause the traditional models to fail to correctly identify content by a malicious actor. A common target of malicious actors are celebrities or famous persons whose names and faces can be improperly used in content items by malicious actors. None of the conventional solutions is effective in correctly and reliably identifying policy-violating content such as deceptive content relating to celebrities.

SUMMARY

Celebrity or famous persons' names and faces can be used in content items in a deceptive way, for example, by falsely suggesting that a celebrity endorses some product or cause that the celebrity never actually endorsed, or by using the celebrity's name or face to promote something with permission. A machine-learning model is used by an online system to automatically recognize these types of deception and prevent this deceptive content from propagating to other users.

For various content item, an online system generates a score indicating a likelihood of the content item having deceptive information. The online system extracts features from the content item. Examples of a feature include a user's name, a user's face image, a user profile, a user's facial features, a user account, a user ID, a current location of the user, a post location where the content item is posted, keywords and/or phrases of the content item, the content item's source country that provided the content item, and the target country to whom the content item is directed, etc. The online system identifies one or more users from the content item (e.g., celebrities or persons with more than a threshold number of followers), and extracts features describing the one or more identified users (e.g., uses facial recognition to extract facial features of the user). The online system matches the features describing the one or more identified users with user accounts from a database storing user accounts having more than a threshold number of followers in the online system, and sets a feature value based on the matching. Examples of a database include a celebrity user account store storing information associated with a celebrity determined to occur in content items with deceptive information, a keywords database storing keywords and/or phrases determined to occur in content items with deceptive information, and a locations database storing location information determined to occur in content items with deceptive information.

The online system provides the extracted features to a machine learning based model configured to generate a score indicating whether the content item comprises deceptive information, and executes the machine learning based model to generate a score for the content item. In response to the generated score indicating a likelihood that the content item includes deceptive information, the online system determines whether the content item conforms to content policies of the online system. The online system determines a rate of distribution of the content item to users of the online system based on the determination of whether the content item conforms to content policies of the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
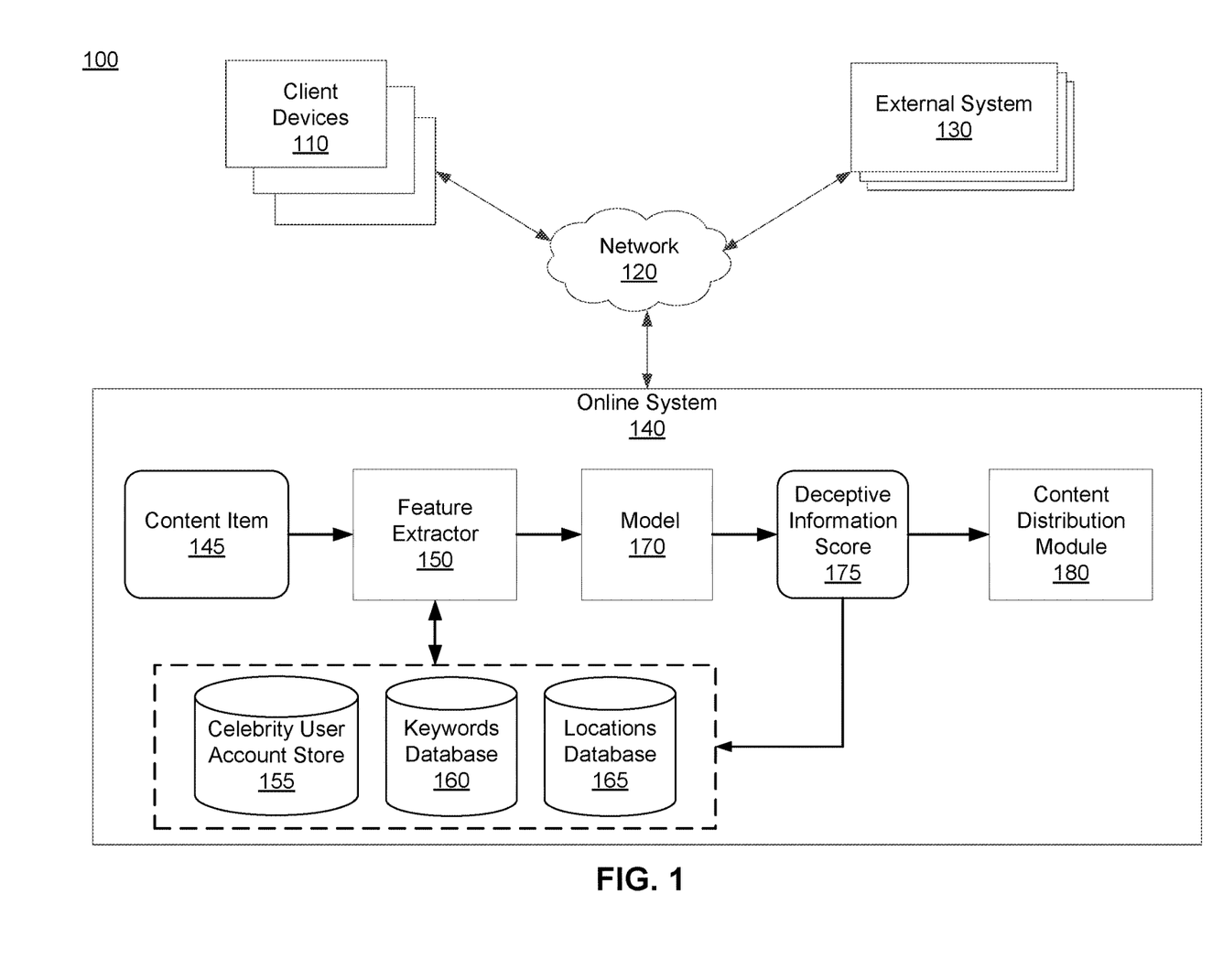
FIG. 1 is a system environment of an online system, in accordance with an embodiment.

FIG. 1 is a system environment 100 of an online system 140, in accordance with an embodiment. The system environment 100 shown by FIG. 1 comprises one or more client devices 110, a network 120, one or more external systems 130, and the online system 140. In alternative configurations, different and/or additional components may be included in the system environment 100. The embodiments described herein can be adapted to online systems that are social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more external systems 130 may be coupled to the network 120 for communicating with the online system 140. In one embodiment, an external system 130 is an application provider communicating information describing applications for execution by a client device 110 or communicating data to client devices 110 for use by an application executing on the client device 110. In other embodiments, an external system 130 provides content or other information for presentation via a client device 110. An external system 130 may also communicate information to the online system 140, such as advertisements, content, or information about an application provided by the external system 130.

The online system 140 allows its users to post content to the online system 140 for presentation to other users of the online system 140, allowing the users interact with each other. Examples of content include stories, photos, videos, and invitations. Additionally, the online system 140 typically generates content items describing actions performed by users and identified by the online system 140. For example, a content item is generated when a user of the online system 140 checks into a location, shares content posted by another user, or performs any other suitable interaction.

The online system 140 determines whether a content item includes deceptive information or misinformation relating to a user, such as celebrity. A celebrity or famous person can be any individual who is generally known to the public (e.g., movie stars, government officials, authors, musicians, TV actors, newscasters, etc.) and can include users with more than a threshold number of followers (e.g., in a social networking system, users with more than a threshold number of connections in a social graph, such as more than 100, 1000, 10,000, 100,000 connections or followers, etc.). These may be followers of a celebrity account, web page, brand page, blog, news article, etc.

As shown in FIG. 1, the online system 140 receives a content item 145. The online system 140 uses a feature extractor 150 to extract features of the content item 145. A feature associated with a content item describes characteristics of content of the content item, and characteristics of context associated with the content item. Examples of characteristics of content may include targeting criteria (e.g., target users to whom the content will be delivered, etc.), textual content (e.g., keywords, phrases, a name or face of a celebrity, a title, a body, an image, an audio, a video, etc.), topics associated with the content (e.g., derived from the textual content), a time that the content was posted, and a location (e.g., a post location, a pair of the source country that provided the content and the target country to whom the content is directed). Examples of characteristics of context associated with the content item may include information associated with account creator (e.g., celebrity user accounts, a user ID associated with the account creator, the account creator's user profile, the account creator's current location, administrator user ID, etc.), information associated with landing page (LP) (e.g., LP domain, onsite LP ID, offsite LP ID, etc.), and other information associated with context (e.g., administrator DATR, PhotoDNA, videoDNA, currency, etc.). Thus, these characteristics of the content and the context may describe both what the content is and the context in which it was provided for display to users.

The online system 140 matches the extracted features with one or more databases. As shown in FIG. 1, the online system 140 includes a celebrity user account store 155 storing information associated with a celebrity determined to occur in content items with deceptive information, a keywords database 160 storing keywords and/or phrases determined to occur in content items with deceptive information, and a locations database 165 storing location information determined to occur in content items with deceptive information. Examples of information associated with a celebrity in the celebrity user account store 155 include a user account, a user ID, a user profile including a name and face images of a celebrity, a user's facial features describing characteristics of a user's face (e.g., eyes, noses, mouth, jaw lines), a user account's location, a user account's country, a user's country, characteristics of content associated with the content item including a celebrity, and characteristics of context associated with the content item including a celebrity. Examples of keywords and/or phrases stored in the keywords database 160 include keywords and/or phrases that sensationalize a content item (e.g., including a word "dead," "shocking," or "unbelieved," etc.). Examples of location information stored in the locations database 165 include a post location where a content item having deceptive information is located, and a pair of a source country that provided the content and the target country to whom the content is directed. In various embodiments, celebrity information may be manually provided by an expert or extracted from user accounts that have more than a threshold number of followers (celebrity accounts). The online system 140 sets a feature value for each extracted feature based on the matching. For example, the online system 140 identifies one or more users from the content item 145, extracts information (e.g., features) describing the one or more identified users, matches the information describing the one or more identified users with the one or more databases, and sets a feature value for each extracted feature associated with the content item 145.

The online system 140 executes a model 170 that takes in the extracted features describing the content item 145 as an input and generates a deceptive information score 175 indicating whether the content item 145 includes deceptive information. If the generated deceptive information score 175 is above a threshold, the online system 140 stores the content item 145 and extracted features in the corresponding databases. In various embodiments, the online system 140 sends the content item 145 for further checking of policy violations or for review by an expert.

The online system 140 sends the content item 145 to a content distribution module 180 that determines a rate of distribution of the content item 145 to users of the online system 140 based on the determination of whether the content item 145 conforms to content policies of the online system 140. If the online system 140 determines that the content item 145 conforms to content policies of the online system 140, the online system 140 performs an action (e.g., disabling or deleting the content item 145). If the online system 140 determines that the content item 145 does not conform to content policies of the online system 140, the content distribution module 180 determines a rate of distribution of the content item 145 to users based on the deceptive information score 175. For example, if the deceptive information score 175 indicates that the content item 145 is less likely to include deceptive information, the content distribution module 180 determines a higher rate to distribute the content item 145 to users of the online system 140. If the deceptive information score 175 indicates that the content item 145 is in a range between having no deceptive information and having deceptive information, but the content item 145 is verified by an expert that the content item 145 can be distributed under certain conditions (e.g., the content item 145 can be distributed to a limited number of users, or to users that are located in certain locations, etc.), the content distribution module 180 determines a lower rate to distribute the content item 145 to users of the online system 140. In some cases, the rate may be zero, and the content item may be blocked from any further dissemination, especially if the content is determined to be likely to have deceptive information.

Online System Configuration

Figure 2:
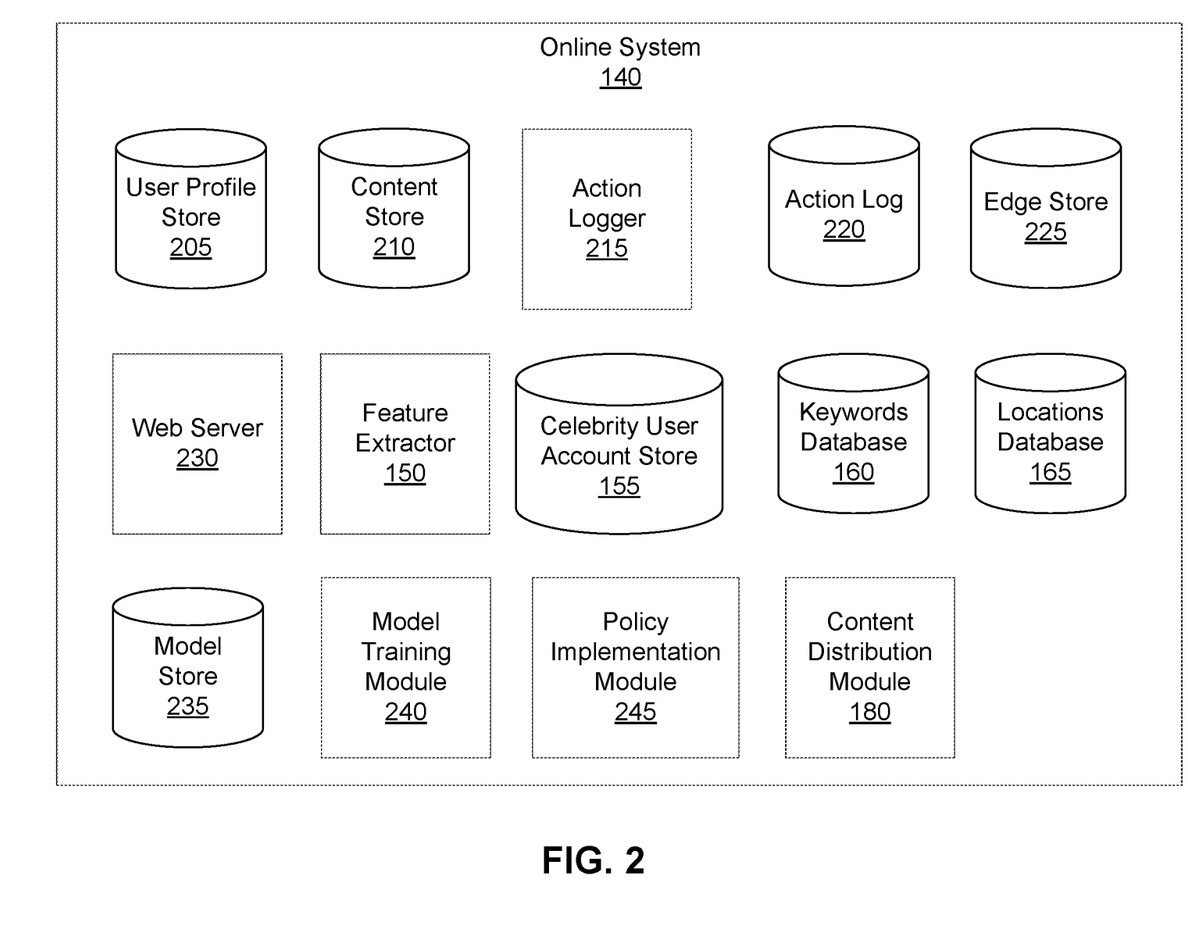
FIG. 2 is an example of an online system, in accordance with an embodiment.

FIG. 2 is an example of the online system 140, in accordance with an embodiment. The online system 140 shown in FIG. 2 includes a user profile store 205, a content store 210, an action logger 215, an action log 220, an edge store 225, a web server 230, the feature extractor 150, the celebrity user account store 155, the keywords database 160, the locations database 165, a model store 235, a model training module 240, a policy implementation module 245, and a content distribution module 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items (e.g., the content item 145 as shown in FIG. 1)." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on external systems 130 that communicate information to the online system 140. Users may interact with various objects on the online system 140, and information describing these interactions are stored in the action log 220. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking"

the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on an external system 130, such as an external website, and communicated to the online system 140. For example, an e-commerce website that primarily sells sporting equipment at bargain prices may recognize a user of the online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on the external system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Users and objects within the online system 140 can represented as nodes in a social graph that are connected by edges stored in the edge store 225.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 230 links the online system 140 via the network 120 to the one or more client devices 110, as well as to the one or more external systems 130. The web server 230 serves web pages, as well as other web-related content, such as JAVA®, FLASH®, XML and so forth. The web server 230 may receive and route messages between the online system 140 and the client device 110, for example, instant messages, queued messages (e.g., email), text messages, short message service (SMS) messages, or messages sent using any other suitable messaging technique. A user may send a request to the web server 230 to upload information (e.g., images or videos) that are stored in the content store 210. Additionally, the web server 230 may provide application programming interface (API) functionality to send data directly to native client device operating systems, such as IOS®, ANDROID™, WEBOS® or RIM®.

The feature extractor 150 extracts features from a content item received from the content store 210 and/or the external system 130. The feature extractor 150 identifies one or more users from the received content item. For example, the feature extractor 150 extracts one or more features associated with an account creator (e.g., a user account, a user ID, etc.). The feature extractor 150 extracts information describing the one or more identified users. Examples of the information include a user account, a user ID, a user profile, a user's name, a user' face image, a user's facial features describing characteristics of a user's face (e.g., eyes, noses, mouth, jaw lines), a user's current location, a user's country, characteristics of content associated with the content item, and characteristics of context associated with the content item.

The feature extractor 150 matches the information describing the one or more identified users with the one or more databases. For example, the feature extractor 150 matches the information describing the one or more identified users with user accounts from the celebrity user account store 155 database storing celebrity user accounts having more than a threshold number of followers in the online system 140. In various embodiments, the feature extractor 150 identifies facial features of the face of the user from the content item, and determines whether the identified facial features of the face of user match facial features of user accounts stored in the database or match the facial features of a celebrity based on public images of the celebrity. For example, the feature extractor 150 matches positions, sizes, shapes, biometrics, or skin textures of the identified facial features against the facial features of user accounts stored in the database. The system can do a feature-by-feature match, including matching eye features extracted from an image with eye features stored in a database for a particular celebrity, and can get a confidence value on the match. The system can similarly do a feature match for nose, jawline, hair, eyebrows, cheekbones, etc., with different confidence values for each. In some embodiments, a separate machine learning model is trained on each of the features of the face, and outputs a likelihood of a match. These likelihoods or confidence values can be combined to get a total confidence value for the overall facial match that is used to identify whether the image does actually include the celebrity.

In another example, the feature extractor 150 identifies a keyword from the content item. The feature extractor 150 matches the identified keyword against keywords retrieved from the keywords database 160 storing keywords determined to occur in content items with deceptive information. In various embodiments, the extracted feature includes a pair of country names having a first country name and a second country name. The first country name represents a country that is a source of the content item and the second country name represents a country that is a target of the content item. The feature extractor 150 matches the pair of country names with the locations database 165.

The feature extractor 150 sets a feature value for each extracted feature based on the matching. For example, if the feature extractor 150 determines that an extracted feature has information that matches the information describing the one or more identified users with the one or more databases, the feature extractor 150 sets a higher value (or a lower value) for that extracted feature than other extracted features.

The model training module 240 trains a machine learning based model using one or more training datasets, each having one or more content items labeled as one of deceptive or not deceptive. The machine learning based model generates a score indicating a likelihood of the content item having deceptive information.

For example, the model training module 240 receives one or more training datasets from the one more databases (e.g., the celebrity user account store 155, the keywords database 160, the locations database 165), and/or from other databases (not shown in FIG. 2) that include content items having no deceptive information. For each content item of the training dataset, the model training module 240 instructs the feature extractor 150 to extract features from the content item. The model training module 240 provides the extracted features to an untrained machine learning based model stored in the model store 235, and executes the untrained machine learning based model to generate a score for the content item. The model training module 240 compares the generated score with a corresponding label associated with the content item, and adjusts weights of the extracted features of the content item, such that features that are more relevant to the expected label associated with the input tend to have higher weight than features that are less relevant to the expected label. This process is repeated iteratively until a difference between a weighted aggregate of feature scores corresponding to the extracted features and the expected label is determined to be below a certain threshold value. The model training module 240 stores the trained machine learning based model in the model store 235.

In some embodiments, the model training module 240 trains a memorization model based one or more training algorithms. Examples of training algorithms may include mini-batch-based stochastic gradient descent (SGD), gradient boosted decision trees (GBDT), SVM (support vector machine), neural networks, logistic regression, naïve Bayes, memory-based learning, random forests, decision trees, bagged trees, boosted trees, or boosted stumps.

The policy implementation module 245 implements policies based in part on the trained machine learning based model. The machine learning based model generates, for each content item, a likelihood score indicating how likely the content item contains deceptive information. For example, for each content item, the policy implementation module 245 executes the trained machine learning based model to generate a score. The policy implementation module 245 compares the generated score with various ranges each corresponding to actions for the online system 140 to take in response to the content item predicted to have deceptive information. Examples of actions for the online system 140 to take include: disabling or deleting the content item and/or other information associated with the bad campaign (e.g., user ID, content in the content store 210, etc.), ignoring the content item, and additionally reviewing the content item. When a score indicates additional review of the content item, the policy implementation module 245 may compile information to aid in reviewing the content item. For example, the policy implementation module 245 may compile data about how often the content item and the account creator have violated account terms and may organize the data according to the type of account terms that the account and the account creator have violated.

In some embodiments, the policy implementation module 245 determines a range of likelihood scores including the predicted likelihood score of the content item. Based on the range including the predicted likelihood score of the content item, a corresponding action is performed. For example, if the predicted likelihood score is determined to be in a lowest range of likelihood scores, the content item is determined to have a high level of trustworthiness (e.g., the content item is less likely to have no deceptive information) and the content item is allowed to deliver to the online system's users. If the predicted likelihood score is determined to be in a highest range of likelihood scores, the content item is determined to have a low level of trustworthiness (e.g., the content item is more likely to have deceptive information) and the policy implementation module 245 disables or deletes the content item. However, if the predicted likelihood score is determined to be in a mid-level range of likelihood scores, the policy implementation module 245 sends the content item to human reviewers to determine if the content item violates account terms. If the human reviewers determine that the content item violates account terms, the policy implementation module 245 disables or deletes the content item. If the human reviewers determine that the content item does not violate account terms, the policy implementation module 245 ignores the content item.

The online system 140 sends the content item 145 to a content distribution module 180 that determines a rate of distribution of the content item 145 to users of the online system 140. The rate is based on the determination of whether the content item 145 conforms to content policies of the online system 140, as described with regard to FIG. 1.

Model Training

Figure 3:
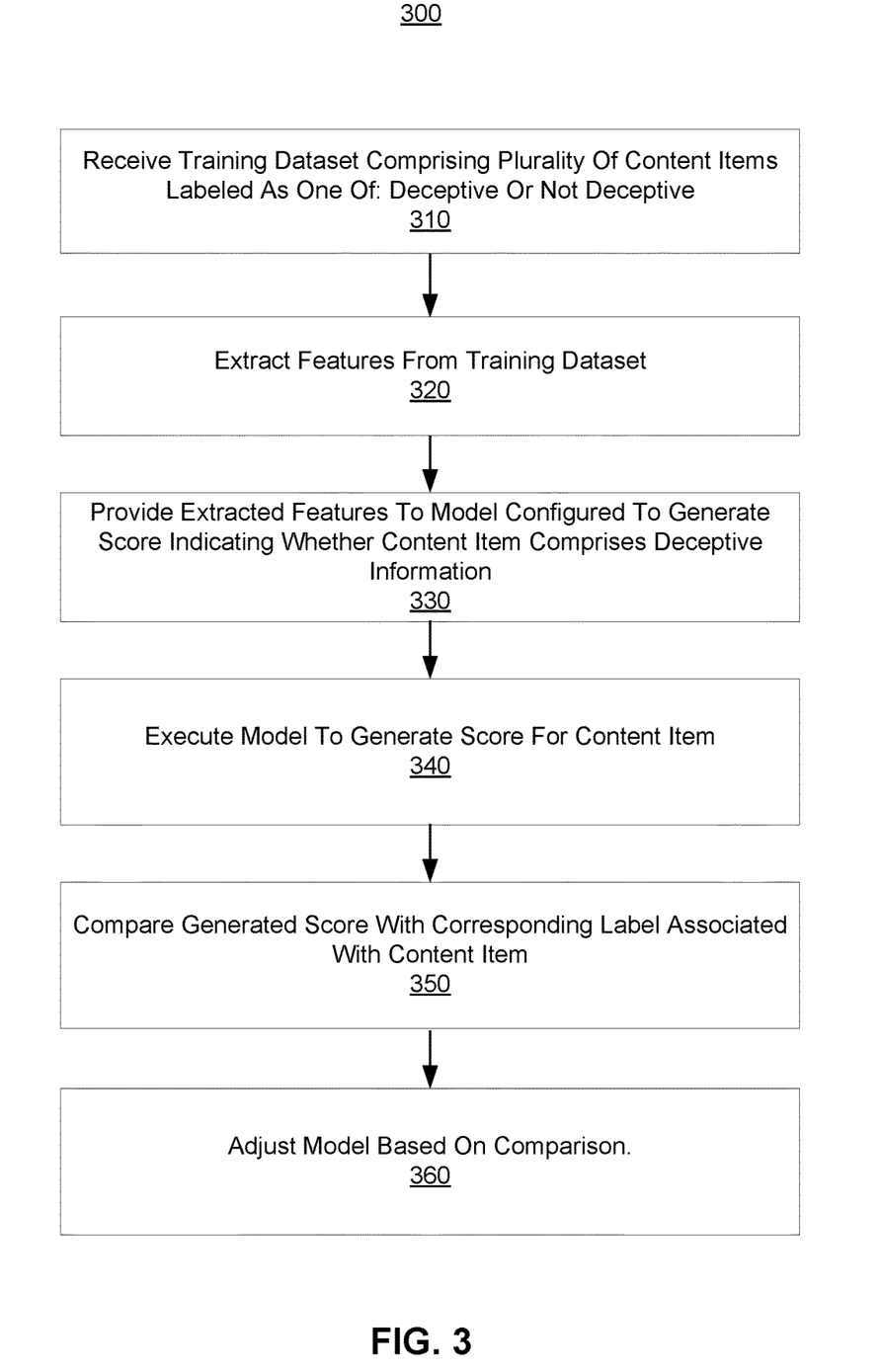
FIG. 3 is a flowchart illustrating a process for training a machine learning based model, in accordance with an embodiment.

FIG. 3 is a flowchart illustrating a process 300 for training a machine learning based model, in accordance with an embodiment. The process 300 may include different or additional steps than those described in conjunction with FIG. 3 in some embodiments or perform steps in different orders than the order described in conjunction with FIG. 3.

The online system 140 receives 310 a training dataset having a plurality of content items labeled as one of: deceptive or not deceptive. For each content item, the online system 140 extracts 320 features from the content item. The online system 140 provides 330 the extracted features to a machine learning based model configured to generate score indicating whether content item comprises deceptive information. The online system 140 executes 340 the machine learning based model to generate a score for the content item. The online system 140 compares 350 the generated score with a corresponding label associated with the content item, and adjusts 360 the machine learning based model based on the comparison. Examples of training the machine learning based model are described above with regard to the model training module 240 of FIG. 2.

Policy Implementation Based on Machine Learning Based Model

Figure 4:
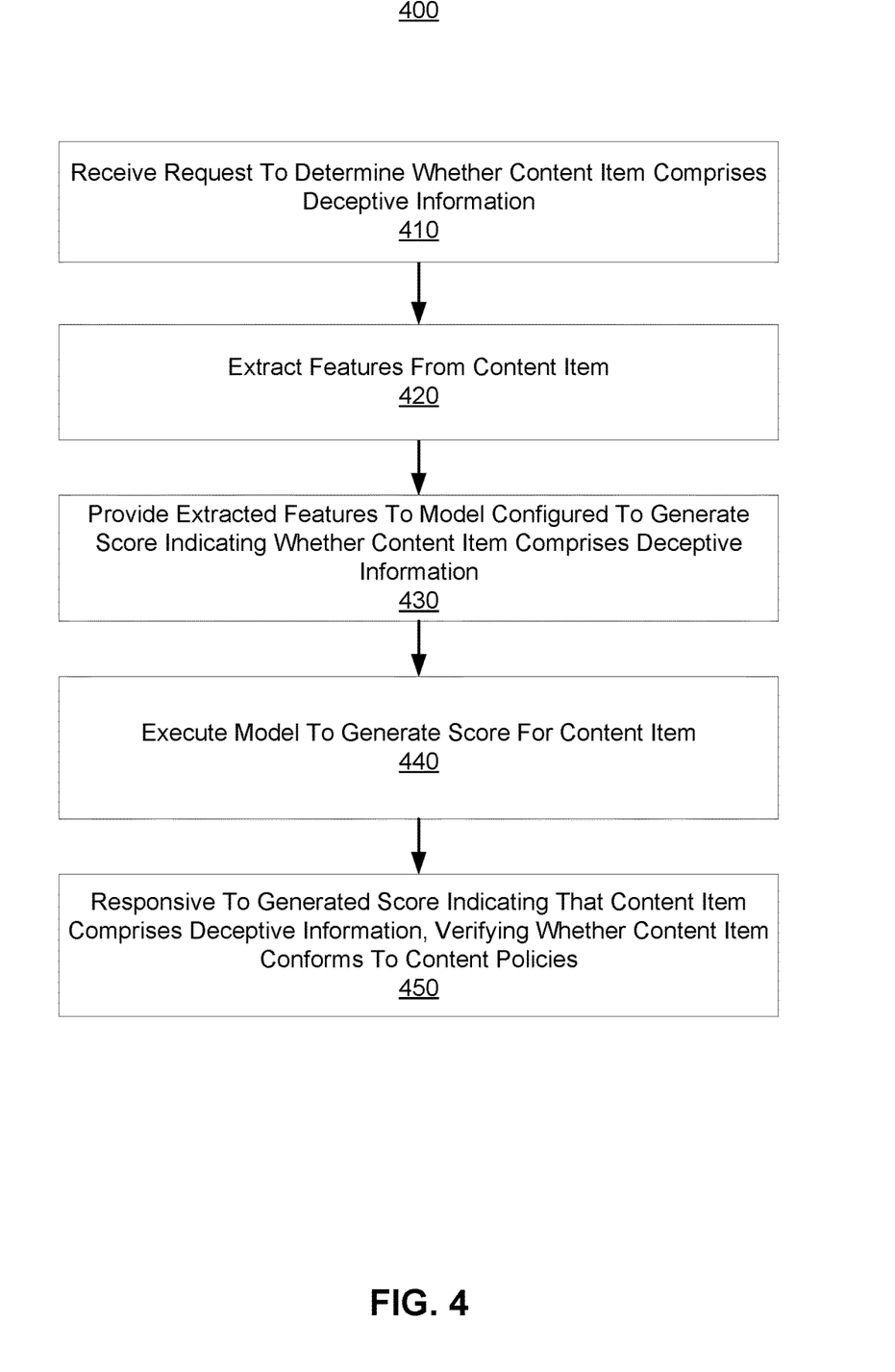
FIG. 4 is a flowchart illustrating a process for implementing a policy to a content item that is predicted to violate account terms based on a machine learning based model, in accordance with an embodiment.

FIG. 4 is a flowchart illustrating a process 400 for implementing a policy to a content item that is predicted to violate account terms based on a machine learning based model, in accordance with an embodiment. The process 400 may include different or additional steps than those described in conjunction with FIG. 4 in some embodiments or perform steps in different orders than the order described in conjunction with FIG. 4.

The online system 140 receives 410 a request to determine whether a content item comprises deceptive information. The online system 140 extracts 420 features from the content item, as described above with regard to the feature extractor 150 of FIG. 1 and FIG. 2. The online system 140 provides 430 the extracted features to a machine learning based model configured to generate score indicating whether a content item comprises deceptive information, and executes 440 the machine learning based model to generate the score for the content item, as described above with regard to the policy implementation module 245 of FIG. 2. Responsive to the generated score indicating that content item comprises deceptive information, the online system 140 verifies 450 whether the content item conforms to content policies, as described above with regard to the policy implementation module 245 of FIG. 2. Or in some cases, since it includes deceptive information, it is automatically determined to violate content policies and is blocked from being sent to users in the online system 140.

In some cases, the content may be blocked entirely from distribution to users. In other cases, the system may reduce the rate at which the content is sent, if for example it is predicted with low confidence to have deceptive material. Since it is not clear whether there is actual deceptive content, the rate of provision of the content item to users may simply be reduced so that fewer users see the content, though it is not completely blocked. If there is some deceptive content, but it is rated low in terms of its deceptiveness (e.g., it does not actually include any false information, but it does use a term that is typically associated with spam-like content), it may also be allowed to have some distribution to users. In some cases, the content can be returned to the creator of the content for revision, and in other cases, the user account who created the content may be black listed or flagged for more scrutiny with regard to any future content coming from that account.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
  receiving, by an online system, a request to determine whether a content item comprises deceptive information, the request identifying the content item, wherein the content item is for distribution to users of the online system;
  extracting features from the content item, the extracting comprising:
    identifying one or more users from the content item;
    extracting information describing the one or more identified users, the information comprising one or more of: a name of a user or an image containing a face of a user;
    obtaining information from one or more user accounts of a social networking system associated with the one or more identified users;
    determining that the one or more user accounts include a celebrity user account, wherein a user account is determined to be a celebrity user account if the user account has more than a threshold number of followers in the social networking system;
    matching the information extracted from the content item describing the user associated with the celebrity user account and information obtained from the celebrity user account;

setting a first feature value based on the matching information describing features of the content item describing the user associated with the celebrity user account that match corresponding features of information obtained from the celebrity user account;

identifying a pair of country names including a first country that is a source of the content item and a second country that is a target destination of the content item, the first country being identified based on a post location where the content item was posted;

matching the pair of country names to location information stored in a locations database storing pairs of source and target country names associated with content items including deceptive information; and setting a second feature value based on a result of matching the pair of country names to the location information stored in the location database;

providing the extracted features to a machine learning based model configured to generate a score indicating whether the content item comprises deceptive information, the machine learning based model trained based on a training dataset including a first plurality of content items labeled as deceptive and a second plurality of content items labeled as not deceptive;

executing the machine learning based model to generate the score for the content item;

responsive to the generated score indicating a likelihood of the content item comprising deceptive information, determining whether the content item conforms to content policies of the online system; and determining a rate of distribution of the content item to users of the online system based on the determination of whether the content item conforms to content policies of the online system.

2. The computer-implemented method of claim 1, wherein extracting the features further comprises:

identifying a keyword from the content item;

matching the identified keyword against keywords retrieved from a keywords database, the keywords database comprising keywords determined to occur in content items with deceptive information; and setting a second feature value based on the matching the identified keyword.

3. The computer-implemented method of claim 1, wherein the celebrity user account store comprises facial features of user accounts having more than the threshold number of followers, wherein extracting the features further comprises:

identifying facial features of the face of the user from the content item; and determining whether the identified facial features of the face of user match facial features of user accounts stored in the celebrity user account store; and setting a second feature value based on the determining.

4. The computer-implemented method of claim 3, wherein determining whether the identified facial features of the face of user match facial features of user accounts stored in the celebrity user account store comprises matching positions, sizes, shapes, biometrics, or skin textures of the identified facial features against the facial features of user accounts stored in the celebrity user account store.

5. The computer-implemented method of claim 1, wherein the machine learning based model determines a weighted aggregate of feature scores corresponding to the extracted features.

6. The computer-implemented method of claim 1, wherein verifying whether the content item conforms to content policies of the online system comprises;

comparing the generated score with a plurality of ranges of scores, each range of scores associated with an action that is performed by the online system in association with the content item; and selecting an action corresponding to a range of scores that include the generated score; and performing the selected action.

7. The computer-implemented method of claim 6, wherein the action is one or more of: disabling or deleting the content item, or sending the content item for review.

8. The computer-implemented method of claim 1, wherein the plurality of content items is a first plurality of content items, the method further comprising training the machine learning based model, the training comprising:

receiving the training dataset further comprising a second plurality of content items labeled as deceptive; and training the model based on the training dataset.

9. The computer-implemented method of claim 1, further comprising:

requesting human verification that the content item can be distributed under predetermined conditions including either distribution to a limited number of users or to users in predetermined locations, wherein the distribution of the content item is performed under the predetermined conditions, and wherein determining the rate of distribution of the content item to users of the online system is further based on the human verification; and distributing the content item at the rate of distribution and under the predetermined conditions.

10. The computer-implemented method of claim 1, wherein the first feature value represents a likelihood of the content item including an image of a celebrity from the celebrity user account store.

11. The computer-implemented method of claim 1, wherein the extracted features include at least a feature extracted from an image of a celebrity from the celebrity user account store.

12. The computer-implemented method of claim 1, wherein the rate of distribution of the content item is nonzero.

13. The computer-implemented method of claim 1, further comprising:

flagging a creator of the content item to receive review of future content items created by the creator.

14. The computer-implemented method of claim 1, further comprising:

in response to the generated score indicating additional review of the content item is needed:

identifying a frequency at which a creator of the content item has violated account terms of the online system; and sending the content item and the identified frequency for review.

15. The computer-implemented method of claim 1, further comprising:

returning the content item to a creator of the content item for revision.

16. A non-transitory computer-readable medium comprising computer program instructions that when executed by a computer processor of an online system causes the processor to perform steps comprising:

receiving, by the online system, a request to determine whether a content item comprises deceptive information, the request identifying the content item, wherein the content item is for distribution to users of the online system;
extracting features from the content item, the extracting comprising:
  identifying one or more users from the content item;
  extracting information describing the one or more identified users, the information comprising one or more of: a name of a user or an image containing a face of a user;
  obtaining information from one or more user accounts of a social networking system associated with the one or more identified users;
  determining that the one or more user accounts include a celebrity user account, wherein a user account is determined to be a celebrity user account if the user account has more than a threshold number of followers in the social networking system;
  matching the information extracted from the content item describing the user associated with the celebrity user account and information obtained from the celebrity user account;
  setting a first feature value based on the matching information describing features of the content item describing the user associated with the celebrity user account that match corresponding features of the information obtained from the celebrity user account;
  identifying a pair of country names including a first country that is a source of the content item and a second country that is a target destination of the content item, the first country being identified based on a post location where the content item was posted;
  matching the pair of country names to location information stored in a locations database storing pairs of source and target country names associated with content items including deceptive information; and
  setting a second feature value based on a result of matching the pair of country names to the location information stored in the location database;
providing the extracted features to a machine learning based model configured to generate a score indicating whether the content item comprises deceptive information, the machine learning based model trained based on a training dataset including a first plurality of content items labeled as deceptive and a second plurality of content items labeled as not deceptive;
executing the machine learning based model to generate the score for the content item;
responsive to the generated score indicating a likelihood of the content item comprising deceptive information, determining whether the content item conforms to content policies of the online system; and
determining a rate of distribution of the content item to users of the online system based on the determination of whether the content item conforms to content policies of the online system.

17. The non-transitory computer-readable medium of claim 16, wherein extracting the features further comprises:
  identifying a keyword from the content item;
  matching the identified keyword against keywords retrieved from a keywords database, the keywords database comprising keywords determined to occur in content items with deceptive information; and
  setting a second feature value based on the matching the identified keyword.

18. The non-transitory computer-readable medium of claim 16, wherein the celebrity user account store comprises facial features of user accounts having more than the threshold number of followers, wherein extracting the features further comprises:
  identifying facial features of the face of the user from the content item; and
  determining whether the identified facial features of the face of user match facial features of user accounts stored in the celebrity user account store; and
  setting a second feature value based on the determining.

19. The non-transitory computer-readable medium of claim 16, wherein the machine learning based model determines a weighted aggregate of feature scores corresponding to the extracted features.

20. The non-transitory computer-readable medium of claim 16, wherein verifying whether the content item conforms to content policies of the online system comprises;
  comparing the generated score with a plurality of ranges of scores, each range of scores associated with an action that is performed by the online system in association with the content item; and
  selecting an action corresponding to a range of scores that include the generated score; and
  performing the selected action.

* * * * *